UNITED STATES PATENT OFFICE.

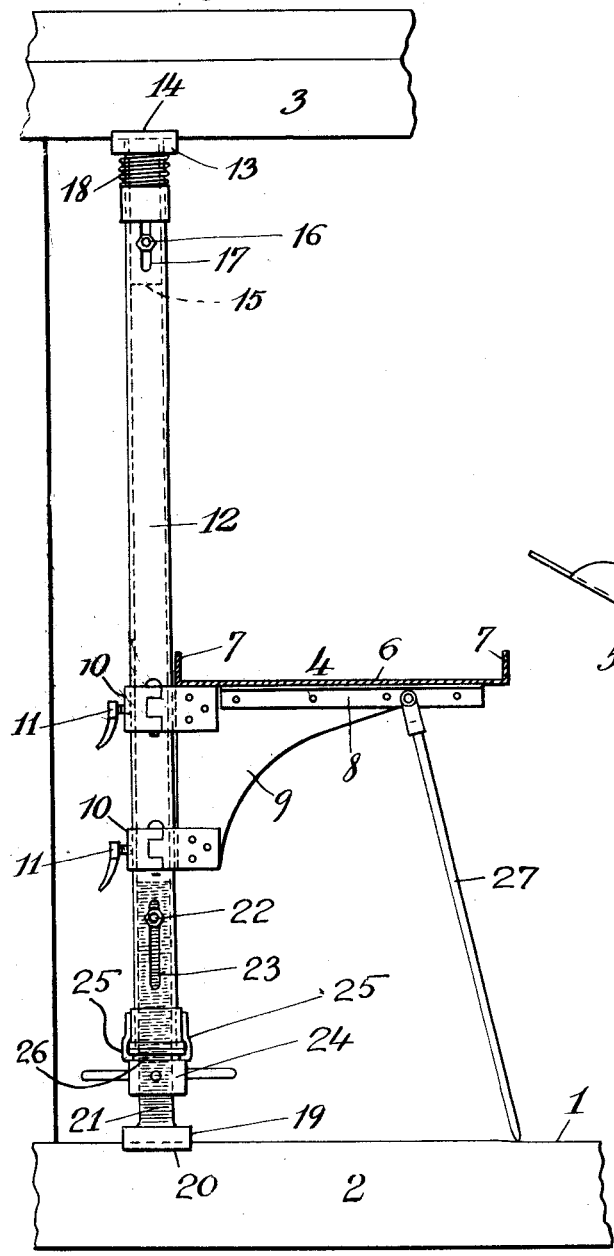
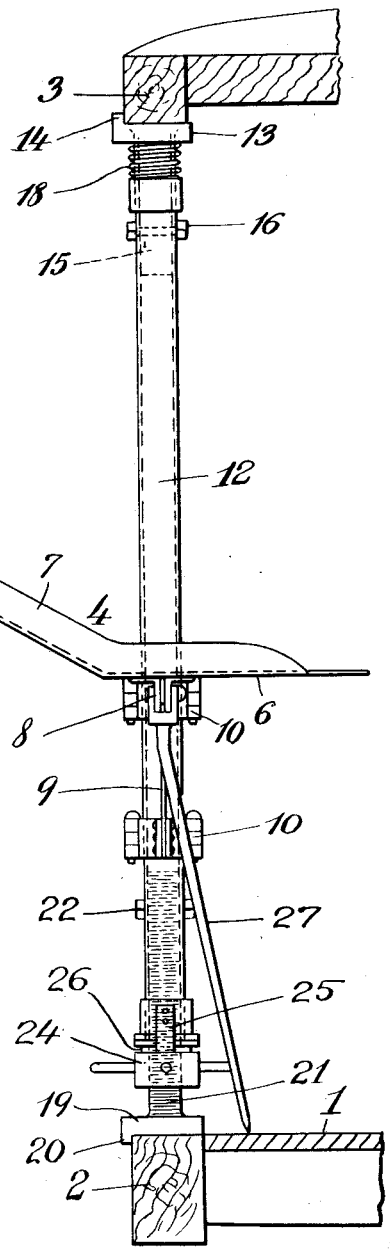

ALEXANDER V. JENSEN, OF DEVILS SLIDE, UTAH.

LOADING-CHUTE.

1,123,882.  Specification of Letters Patent.  Patented Jan. 5, 1915.

Application filed January 15, 1914. Serial No. 812,208.

*To all whom it may concern:*

Be it known that I, ALEXANDER V. JENSEN, a citizen of the Danish Monarchy, and a resident of Devils Slide, Morgan county, Utah, have invented certain new and useful Improvements in Loading-Chutes, of which the following is a specification.

This invention relates to improvements in loading chutes or aprons.

More particularly this invention has reference to certain novel and useful improvements in loading chutes adapted for use with a loading apparatus described in an application filed simultaneously with this application and dated January 15th, 1914, Ser. No. 812,207.

The object of this invention is to provide a loading chute adapted to be secured in an opening as for instance the door opening in a railroad car or other place for the purpose of receiving material and furnishing a chute upon which said material will slide into the car.

In the said application I have described and claimed a loading apparatus comprising two door chutes between which there is secured a conveyer for transporting the material from one chute to the other. The novel feature of said door chutes form the subject matter of this application.

The invention is embodied in a chute and the supporting means therefor as described in detail in this specification and illustrated in the accompanying drawing in which—

Figure 1 is a front view of the chute and Fig. 2 is a side view.

The reference numeral 1 represents the floor of a railway car or building of which 2 is an outer floor beam while 3 is the head beam or roof.

4 is the chute or apron comprising two portions 5 and 6 at an angle to each other and provided with side guides 7. The chute is preferably made of sheet metal and is carried by a chute beam 8 secured to a bracket 9 which is provided with two clamps 10, having clamping or set screws 11, 11, by means of which the clamps and with them the chute are adjustably mounted on a support 12 in the form of a hollow post.

13 is an upper shoe provided with a nose 14. The shoe is carried by a plunger 15 slidably mounted in the post 12 by bolt 16 and slots 17.

18 is a spring.

19 is a bottom or lower shoe having a nose 20. The shoe is carried by a threaded plunger or screw 21 provided with a bolt 22 which slides in slots 23 in the post.

24 is a nut in threaded engagement with the plunger or screw 21. Claws as 25 take into an annular groove 26 in the nut to prevent the screw and nut from falling out of the post 19 when the chute is set up.

27 is a pivoted leg for supporting the chute on the side away from the post 12.

When the chute is to be used, it is placed in position with the upper and lower shoes engaging the door beams on the railroad car as shown. The spring 18 provides elasticity at the upper end which is an aid in erecting the post. After the chute is in place the nut 24 is screwed up to lift the post 12 to firmly secure the chute in position. The height of the chute is regulated by the clamps 10 and screws 11 as will be understood. The material is conveyed by any suitable means to the chute and slides down the portion 5 and over the portion 6 to a conveyer, not shown, or the material may be taken away from the chute portion 6 by hand.

It will be seen that this chute furnishes a convenient means for bridging between two movable conveyers, as shown in the application referred to above, or simply as a stationary chute for guiding material into receiving places.

I claim:—

1. The combination of a support, an upper shoe secured thereto, a spring interposed between the said shoe and support, a lower shoe secured to the latter, means for adjusting the said support on the said shoe, a bracket, means for adjusting and securing the bracket to the said support, a loading chute comprising two continuous integral portions at an angle to each other and secured to said bracket and a supporting leg pivoted to the said bracket.

2. The combination of a supporting post, an upper shoe yieldingly carried by the same, a lower shoe secured to said post, means for adjusting the latter on said lower shoe, means for preventing rotation of the post with respect to the said shoes, a bracket adjustably secured to the said post, a loading chute comprising two continuous integral portions at an angle to each other and secured to the said bracket to the one side of the said post and a supporting leg pivoted on the said bracket away from the said post.

Signed at Ogden, Utah this 5th day of January, 1914.

ALEXANDER V. JENSEN.

Witnesses:
R. R. DORLAND,
IVAN KONIGSBERG.